May 29, 1951 — M. D. BUIVID — 2,554,774
DAMPER FOR ROTARY WING AIRCRAFT
Filed Sept. 25, 1945 — 4 Sheets-Sheet 1
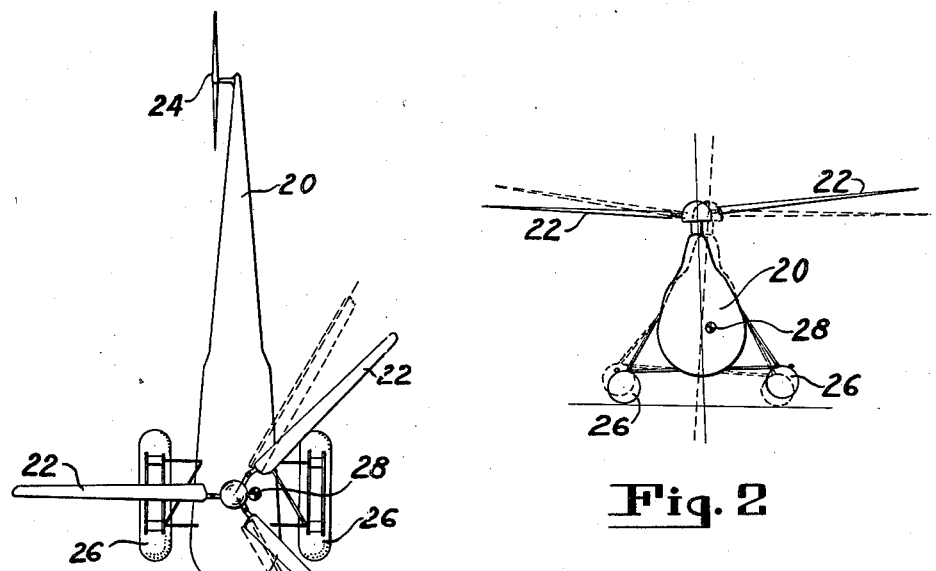
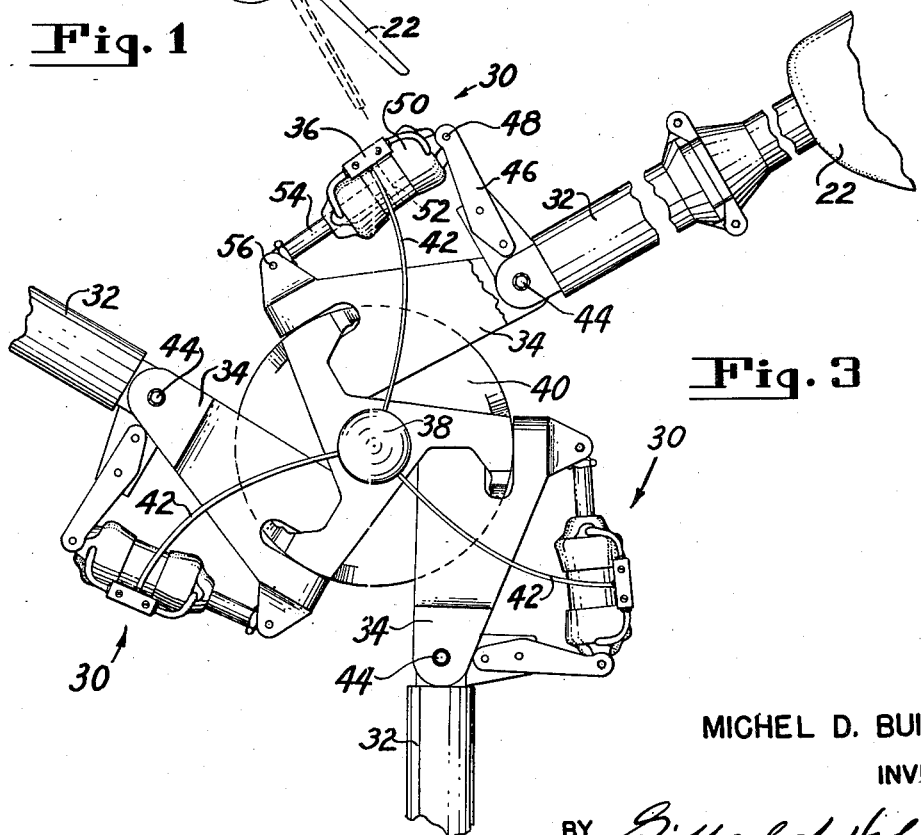
MICHEL D. BUIVID
INVENTOR
BY Gifford S. Holm
AGENT May 29, 1951  M. D. BUIVID  2,554,774
DAMPER FOR ROTARY WING AIRCRAFT
Filed Sept. 25, 1945  4 Sheets-Sheet 3

MICHEL D. BUIVID
INVENTOR

BY *Gifford J. Holmes*
AGENT

Patented May 29, 1951

2,554,774

UNITED STATES PATENT OFFICE 2,554,774

DAMPER FOR ROTARY WING AIRCRAFT

Michel D. Buivid, Milford, Conn., assignor to United Aircraft Corporation, East Hartford, Conn., a corporation of Delaware Application September 25, 1945, Serial No. 618,560

13 Claims. (Cl. 170—160.55)

This invention relates to damping means particularly adapted for use with rotary wing aircraft of the helicopter type such as shown in the application of I. I. Sikorsky, U. S. Appl. Ser. No. 592,862, filed May 9, 1945, which matured into Patent #2,517,509 on Aug. 1, 1950.

In carrying out my invention, dampers are provided between the flapping links and the spars of rotor blades in a manner to obtain the optimum ratio of weight to effort of the damper, while arranging the damper to generate low centrifugal forces. The dampers are constructed so as to have improved operating characteristics including self-priming action, overload relief valve, and substantially constant effort in either sense for a constant applied force, even though the chambers of the damper do not have the same change of volume for a given piston displacement.

With such structure and arrangement of parts, this invention is capable of inhibiting "ground resonance" in helicopters, i. e. the generation of standing waves or vibrations in rotor blades in harmony with, and hence forced by, vibrations of a body carried by resilient gear upon the ground, or other surface, which vibrations increase with time, often to the extent of overturning or breaking parts of the aircraft and, while avoiding ground resonance when the helicopter is near the ground, greatly reducing the chordwise bending stresses in the blades in normal forward flight. "Flight resonance" (similar to ground resonance; but due to pendular oscillations of the body of the craft in harmony with blade vibrations) is also inhibited to eliminate the danger of unstable flight due to vibrations.

It is an important object of my invention to provide damping means for the rotor blades of a rotary wing aircraft of the type having separately articulated rotor blades which is capable of providing maximum damping of blade movements about the drag hinges during landing and take off when conditions favorable to ground resonance are encountered while providing minimum damping of such blade movements about the drag hinges in normal forward flight.

A further object of my invention is to provide a damper for controlling movements of such a rotor blade about its drag hinge which markedly reduces the chordwise bending stresses in the blade in flight while providing the necessary increased damping of such blade movements when the aircraft is in proximity to the ground.

A still further object of my invention is to greatly increase the life of such a rotor blade and damper combination by reducing the stress level in the blade in normal flight when the chordwise blade motion is of large amplitude.

Accordingly, an additional object of this invention is to provide a damper for dissipating vibrations by hydraulic integration thereof, and having improved structural and operating attributes over prior structures.

Another object, in keeping with the above object, is to provide a damper and self centering device for rotary wing aircraft for improving the operation thereof.

Another object is to provide a damper with biasing means for altering the characteristics thereof in powered flight with respect to unpowered flight, and to obtain a resilient drive.

The foregoing and other objects reside in the details of construction of the several modifications for carrying out this invention, and will be either obvious or pointed out in the following specification and claims.

In the drawings:

Figs. 1 and 2 are plan and front elevational views respectively showing a helicopter in "ground resonance";

Fig. 3 is a plan view of a rotor head for helicopters with one form of my invention applied thereto for inhibiting such action;

Figure 4:
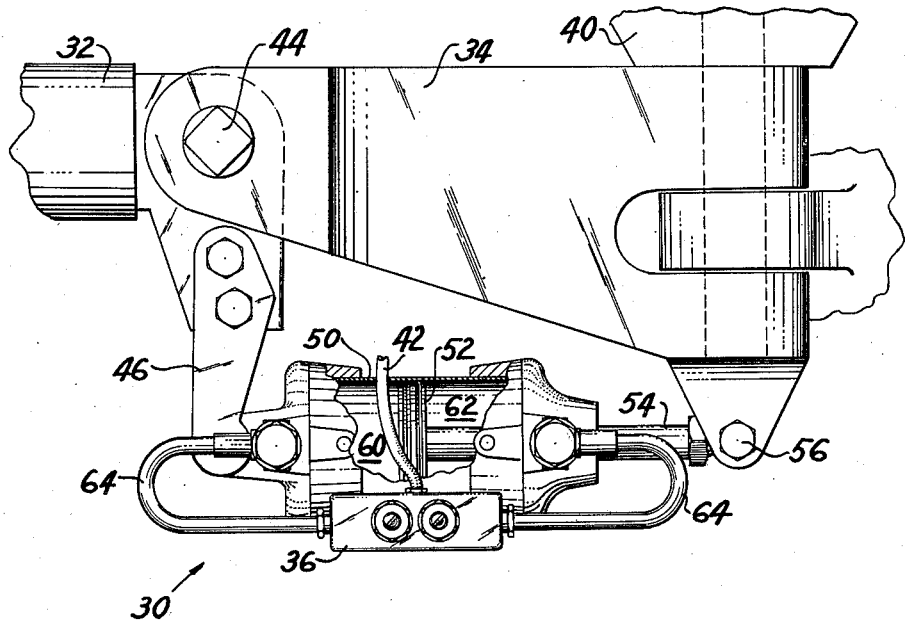
Fig. 4 is an enlarged view of one damper with the casing broken away to show the interior.

In Figs. 1 and 2, a helicopter is shown having a body 20, sustaining rotor blades 22, a torque compensating rotor 24 and mounting gear including a pair of floats 26 or wheels or the like which are capable of sustaining the helicopter upon water or solid surfaces. The helicopter is shown in a position which it would assume after having contacted the ground with the right hand side low as viewed in Figs. 1 and 2 due to an offset center of gravity 28. In Fig. 2, the dotted line position represents the attitude of the helicopter when the ground is first contacted, and the solid line position represents the beginning of harmonic rotary oscillation of the body 20 around the center of gravity 28.

In Fig. 1, the dotted line position of the two blades 22 on the right hand side of the craft is the normal attitude of the blades when the center-line of each of the blades of a three-bladed rotor is substantially 120-degrees angularly spaced from each other blade. The solid line position of the right hand blades 22 is a result of the rotary oscillation around the center of gravity 28 as described above. Inasmuch as the hub of the rotor blades 22 is moved toward the left because of such rotation, the instantaneous action (neglecting the rotary action of the entire rotor) will be to move out of the normal plan position and begin an oscillation. After moving into the position shown, the blades will be whipped due to their rotation into another position on the opposite side of the normal position and will oscillate across this normal position with a period determined by the geometry of the blades and the centrifugal forces acting thereon to force oscillations. With three blades as shown, it is possible to obtain oscillations in phase between different blades so that the net oscillation of all of the rotor blades 22 back and forth of the body 20 may occur at different frequencies. The oscillation of the body of the craft around the center of gravity will have a substantially constant period. However, if the two oscillations, or harmonics of such oscillations, should come into phase with each other, the vibrations would be forced with respect to each other and resonance will result. Such resonance will increase the amplitude of oscillation of the rotor blades 22 and increase the amplitude of rocking of the body 20 around the center of gravity 28 to such an extent that parts of the helicopter may be broken or the entire machine overturned.

I have provided means for preventing the oscillations from building up by shifting phase of the force from a rotor blade to the body of the helicopter, and applied this means to rotor blades in a manner to provide light weight but positive action. The device comprises hydraulic dampers with control means whereby the rate of change of motion of a rotor blade is controlled in either sense of motion of the rotor blade. A resistance is controlled under different operating conditions of the rotor blade in a manner to be particularly pointed out below in connection with the several modifications of the invention. It is to be understood, however, that the specific details of construction of the device are capable of taking forms other than those shown and the spirit of the invention is limited only by the claims.

In Fig. 3, three damping means 30 are shown as connected to spars 32 at one end and to flapping links 34 at their other ends. Inasmuch as each of the three is identical, only one will be described in detail. Each damper 30 is provided with a control valve 36 that connects with a reservoir 38 attached to the hub 40 mounting the rotor blade flapping links 34. The reservoir 38 may be of metal (or of transparent plastic construction to indicate the level of the fluid, preferably oil, therein) and hoses 42 connect the reservoir 38 with the valves 36. Each of the rotor blades 22 is connected by a drag pin 44 to the link 34 and pivots around the pin 44 to relieve stresses on the blade and permit the blade 22 to move into different positions during powered flight and during autorotational flight. An arm 46 is rigidly connected to the spar 32 at its inner end adjacent drag pin 44 and is connected at its outer end by pivot pin 48 to a housing 50 having a cylindrical inner bore. The housing 50 contains a piston 52 connected with a piston rod 54 secured by a pin 56 parallel with the pin 48, which passes through ears on the flapping link 34. The housing 50 is movable by the arm 46 and thus its position is determined by the position of the blade 22 as the latter moves about drag pin 44. Thus, the entire damper 30 moves bodily with the flapping link 34 and the housing 50 moves relative to piston 52 in response to movements of blade 22 pivoted on said flapping link.

In Fig. 4, the housing 50 is shown as broken away in part and the piston 52 is shown in substantially a central position. As the spar 32 carrying the blade 22 rotates in a counterclockwise direction, the housing 50 will be moved toward the right with respect to the piston 52 to contract a left-hand chamber 60 and expand a right-hand chamber 62 defined by the piston 52 in the cylinder 50. Because the piston rod 54 extends into the chamber 62, the rate of change in volume of the chamber 62 will be smaller than the rate of change in volume of the chamber 60 and therefore the fluid, preferably oil, passing through pipes 64 will not be of equal quantity.

Figure 5:
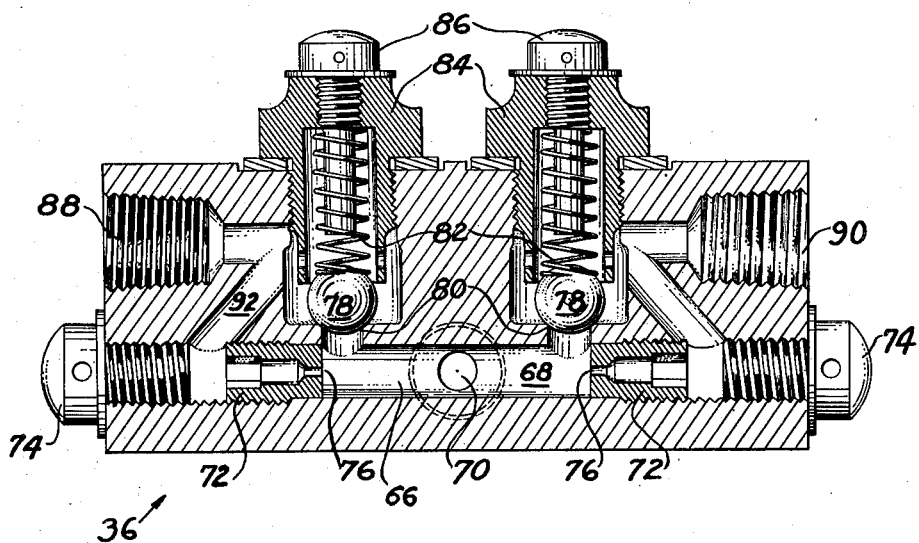
Fig. 5 is a section through the control valve of Fig. 4.

The control valve 36, shown in Fig. 5 in enlarged sectional detail, provides passages for passing fluid to and from the chamber 60, to and from the chamber 62 and also through the pipe 42 to and from the reservoir 38 as the movement of the piston 52 relative to the cylinder 50 requires. The pipes 64 are connected to the top of the cylinder 50 so air will bleed out of the chambers 60 and 62. The control valve mechanism 36 comprises a housing 66 having a through passage 68 communicating with a side passage 70 that connects with the hose 42. The passage 68 is tapped at its ends to receive restriction plugs 72 and seal off plugs 74. The restriction plugs 72 have orifices 76 which may be of equal or unequal sizes or may be adjustable needle valves, depending upon the characteristics desired for the operation of the damper. The plugs 72 can be removed from the tapped passage 68 and changed to change the characteristics of the damper. By-pass valves are provided in the form of balls 78 cooperable with seats 80 ground in the housing 66. The balls 78 are biased into engagement with the seats 80 by springs 82 which are mounted in ball guiding caps 84 provided with screws 86 through which entrapped air can be removed. The lowermost ends of the screws 86 serve as limit stops for the balls 78 to prevent excess movement thereof and damage to the springs 82. The balls 78 act as by-pass and check valves for fluid passing from one side of the piston 52 to the other, or from the reservoir 38 to either of the chambers 60 or 62. The springs 82 are of low tension so that only a small pressure of the fluid is required to lift the balls 78 from their seats. For example, one pound per square inch pressure with the ball seated has proved satisfactory in several installations. The larger chamber 60 connects with an inlet passage 88 of the control valve 36 and the smaller chamber 62 connects with an inlet 90 of the valve 36. Thus, for counterclockwise movement of the spar 32, fluid will flow from the chamber 60 through the left hand pipe 64 into the inlet 88, through a passage 92, through the left hand orifice 76, and into chamber 68. Fluid under pressure from inlet 88 also flows into the chamber above the valve seat 80 of the left-hand check valve and urges the ball 78 of this valve against its seat, while the ball 78 of the right-hand valve is similarly acted upon from above by the lower fluid pressure obtaining in the chamber 62.

Figure 7:
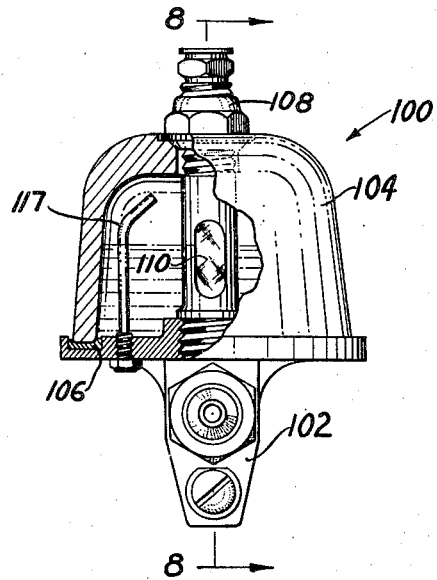
Figs. 7 and 8 are detail views of the valve and reservoir of Fig. 6.
Figure 8:
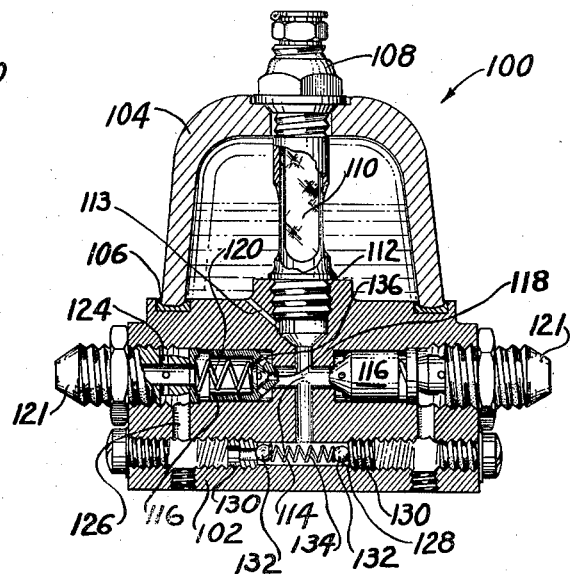

Hence fluid from chamber 68 will flow through the right hand check valve into the smaller chamber 62 in part, and in part through the port 70, through the hose 42 to the reservoir 38 to insure proper working of valves 78 (Fig. 5), and 116 (Fig. 8). The reservoir 38 is vented to atmosphere in a manner to be described in detail in connection with Fig. 7 so that atmospheric pressure is maintained at all times within the dampers 30, except during movement. Thus, for counterclockwise movement of the spar 32, resistance to motion is determined by the restriction of the left hand orifice 76. For clockwise motion of the spar 32, resistance is determined by the right hand orifice 76 coupled with the chamber 62. If it is desired that each sense of movement of the spar 32 exert equal force on the faces of the piston 52 to obtain equal damping of such motion, with unequal piston areas, the right hand orifice 76 may be slightly smaller to create a somewhat higher unit pressure on the face of the piston forming the smaller chamber. With equal piston areas, equal orifices may be used with the valve described above.

As the blade 32 oscillates back and forth, the piston 52 and cylinder 50 will move relatively to each other. The damper 30 will operate due to resistance mentioned above to initially resist large blade movements but permit them to dissipate with time to a certain extent determined by the characteristics of the orifices 76. Upon reversal of the vibration, the opposite action will obtain. The result of vibration will be, therefore, an integrated action during transients, with a tendency in the system to resist accelerations equivalent to opposing motion of the blades with inertia.

Figure 6:
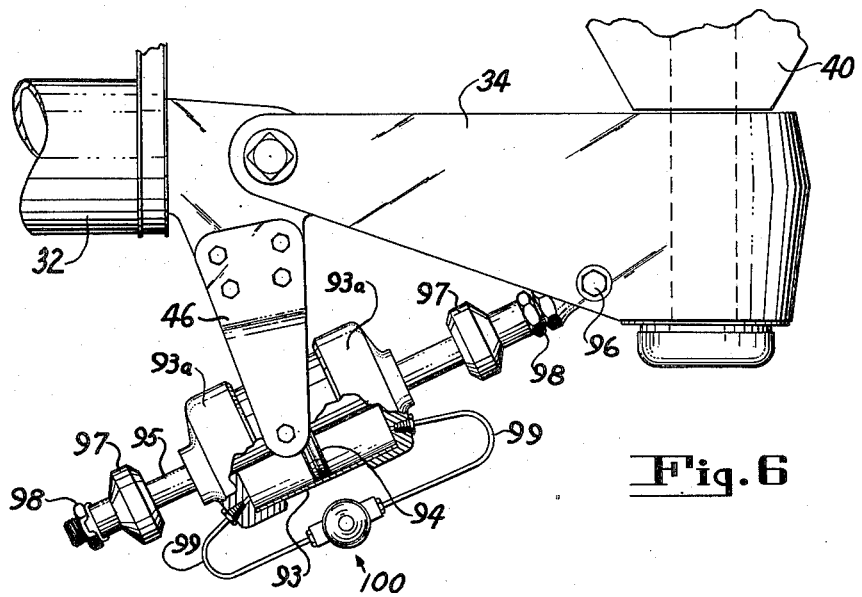
Fig. 6 is a view similar to Fig. 4, but a modification.

In Figs. 6, 7 and 8, a modified structure is shown for damping motions of the spar 32 and comprises a cylinder 93 secured to cups 93a, and cooperable with a piston 94 mounted upon a piston rod 95 that connects to a vertical pivot 96 set in the flapping link 34. The piston rod 95 is provided with resilient bumpers 97 that may be adjustably positioned axially of the piston rod by lock nuts 98. The bumpers 97 limit the movement of the cups 93a along the piston rod 95 and provide yieldable limit stops for cylinder 93. Thus, as the spar 32 moves clockwise, an extreme position is attained when the left hand bumper 97 engages the left hand annulus on the left hand cup 93a. Likewise, counterclockwise motion is limited by engagement of right hand bumper 97 with the right hand cup 93a. Pipes 99 communicate with the chambers formed by the cylinder 93 and piston 94 and connect with a combined reservoir and control valve 100.

In Figs. 7 and 8, the control valve and reservoir 100 is shown as comprising a body 102 mounting a metal or plastic or glass cup 104 inverted and mounted on a gasket 106 in an annular groove in the housing 102. The cup 104 is adapted to contain oil or other suitable fluid at an intermediate level as indicated in the drawing and is provided with a filler connection 108 containing a screen 110. The lower part of the filler connection is screw-threaded at 112 into a female connection in the upper center part of the housing 102. The fluid within the reservoir 104 can pass down through a passage 113 into a cross-passage 114 inside the housing 102. Air may pass out of this cross-passage 114 through the passage 113 into the top of the cup 104 and out of an air vent connection 117 formed of a tube screwed into the annular flange of the housing 102. As will be pointed out below, the control valve shown within the housing 102 is capable of passing air out of the chambers formed by the cylinder 93 and the piston 94 and venting the same to atmosphere through the vent 117.

Within the housing 102, a pair of restriction and check valves 116 are provided with orifice 118 (only one of which is shown in section at the left hand side of the figure), for resisting flow from a left hand inlet connecting nipple 121 from one of the chambers mentioned above out to the cross-passage 114. The orifice 118 during such flow of fluid is the only one acting because the valve 116 will be urged against its seat, as shown. The valve 116 is pressed by a low pressure spring 120 into engagement with this seat.

In the event of overload due to sudden movements of the spar 32, it is desirable to by-pass the orifices 118. For this purpose, each connecting nipple 121 is provided with radial passages 124 leading to a passage 126 connecting with a through passage 128. The passage 128 is tapped at each end and contains adjustable internal plugs 130 provided with axial passages the confronting ends of which provide valve seats for balls 132 that are biased by a spring 134 away from each other. The spring 134, by such construction with equal orifices, will offer equal resistance to flow of the fluid in either sense out of the chambers formed by piston 94 in the cylinders 93. Thus, for sudden movements of the piston 94, the balls 132 can be moved against a force which is equal for either chamber to relieve the pressure in said chamber. The pressure relief setting depends upon the characteristics of the spring 134 biasing balls 132.

Fluid will flow from one of the chambers through one or the other of the nipples 121 through a restriction 118 and in through the other of the check valves 116 to the opposite chamber. At this time, the valve 116 which moves away from its seat against the bias of the spring 120 will offer small resistance to flow because additional passages 136 are provided in the valves 116. Thus, the only substantial resistance to motion will be the restriction provided by one of the orifices 118. The valves 116 are of the replaceable type and the characteristics of the damper may be changed by replacing valves 116 with different sized restrictive orifices 118.

If it is desired that the damping action for one sense of movement be unequal to that of the other sense of movement, the orifices 118 in the valve 116 may be made of unequal diameters. Similarly, if this valving arrangement is to be used with chambers having unequal rates of change, such as the chambers 68, 62 of Fig. 4, the orifices 118 may be equal or unequal depending upon the damping characteristics desired. It is to be noted that the valve 36 for Fig. 4 may be readily used with chambers having equal volumes such as shown in Fig. 6 and the size of the restrictions 76 varied according to the characteristics desired. There is no possibility of the damper locking since the reservoir and by-pass valves compensate for any inequalities of fluid displacement.

As a result of the damper construction of Figs. 6–8 I have been able to achieve an astounding reduction in the chordwise vibratory stress level in the individual rotor blades of a rotary wing aircraft. In the particular helicopter illustrated herein, this has resulted in increasing the life of the blades from 400 flight hours to practically infinite flight time as far as blade spar fatigue due to chordwise bending moments is concerned.

As a rotary wing aircraft approaches the ground for a landing, or as it takes off, the craft has little or no forward speed and hence the advancing and retreating blades move relative to the air at about the same speed and no material flapping of the blades takes place. Consequently there is very little chordwise movement of the blades due to Coriolis forces. Also since there is no difference in drag due to relative movement of the air acting on the advancing and retreating blades, there is a minimum of chordwise movement of the blades due to blade drag. Under these conditions of minimum chordwise blade movement a high degree of blade damping is necessary to meet the critical condition of ground resonance—a condition which originates as a small blade oscillation and rapidly builds up to a large and dangerous one. By providing a large amount of damping under these conditions of small blade movement, the small initial oscillation can be prevented and the dangerous ground resonance will not be encountered.

The damping requirements for avoiding ground resonance are, however, not favorable for normal forward flight. In forward flight flapping of the blades takes place which, due to Coriolis forces, causes chordwise movements of the blades about their drag hinges and there is also a big difference in the drag forces acting on the advancing and retreating blades which aggravates these chordwise blade movements. Hence large blade movements about the drag hinge pivots take place and, if the same large damping effect which is required under conditions favorable to ground resonance is maintained in effect, the chordwise bending stresses in the blade spars will be extremely high and the blade life very short.

During ground runup, when maximum damping is necessary, the chordwise vibratory stresses in the blades are low, whereas in forward flight and maneuvers, particularly at low R. P. M. and forward center of gravity locations, these stresses are high. The fluid pressure in the damper varies directly as the chordwise stress in the blade. Hence by the provision of the relief valves 132 which are set to open when the fluid pressure in the damper produces a stress level in the blade only slightly above that which would occur under conditions of ground resonance, high fluid pressure in the damper during forward flight is relieved and chordwise blade movement of a large amplitude is permitted with a corresponding reduction in bending stress in the blade root. The relief valves 132 do not cut off the peaks of blade oscillation with a sharp horizontal line, as might be expected, but operate to produce a relatively symmetrical sine curve of lower magnitude than that found with the fixed orifices 118 alone.

In initially determining the setting of the relief valves 132 in a given aircraft, the blade stresses are measured during forced ground resonance. The valves 132 are then set to open at a stress level slightly above those measured during this forced ground resonance. Accordingly, the relief valves 132 will never open during landing or take off and the fixed orifices 118 will provide sufficient restriction to produce maximum damping under these conditions and blade oscillation due to ground resonance will not start. However, in normal flight the chordwise blade movements will cause blade stresses greatly above those for which the relief valves 132 are set to open. As the fluid pressure builds up due to chordwise blade oscillation, the relief valves 132 open slowly to relieve the pressure gradually and prevent bending stresses in the blades above the stress level at which blade fatigue sets in and the life of the blade becomes limited.

Figure 9:
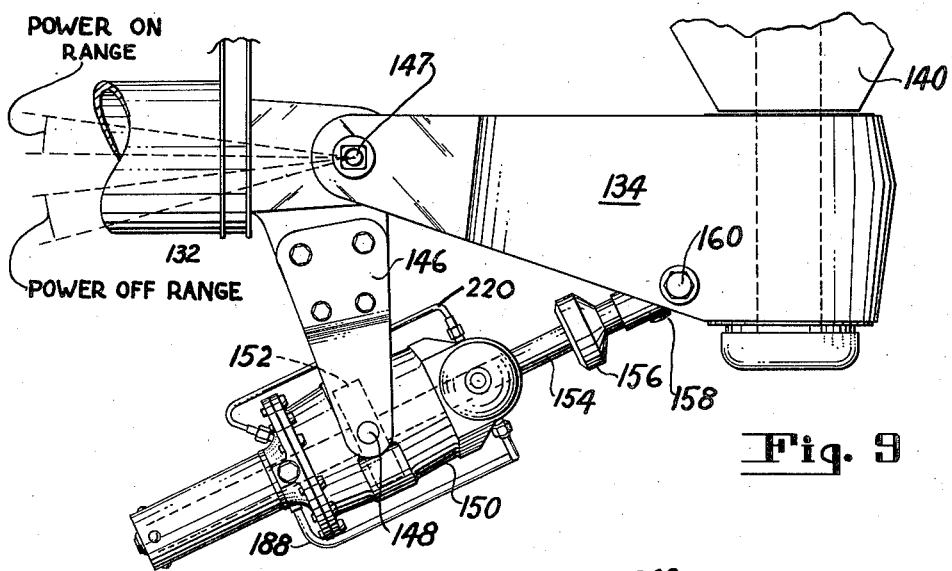
Fig. 9 is a view similar to Fig. 4 but of a modification.

In Fig. 9, a spar 132 is shown as mounted upon a pivot pin 147 and movable, under the influence of power, back into a power-on range of normal movement and into a forward power-off range of movement in which the centerline of spar 132 aligns substantially with the axis of rotation of a hub 140 which is similar to the hub 40 described in connection with Fig. 3. To obtain automatic pitch change, the drag pivot 147 may be inclined to some extent so that when power is applied to the rotor, the pitch of the rotor blade will be increased to absorb more power and obtain a higher lift. When the blade is rotating under the influence of air flow through the rotor, the blade will move due to the centrifugal force into the power-off range and it is desirable at this time to obtain a lower pitch. While such arrangement forms no particular part of the present invention, it is to be understood that the damper now to be described can be used in such a system since universal pivots are provided between the damper and the flapping link, which pivot will permit of mounting at other positions than that shown to permit such movement of the rotor blade under the influence of power.

The spar 132 is provided with a rigid bracket 146 which connects with a pivot 148 to a cylindrical housing 150 containing a piston 152 carried by a piston rod 154. The inner end of the piston rod is provided with a resilient buffer 156, and a universal pivot providing two degrees of freedom in rotation to prevent misalignment comprising a substantially horizontal pivot 158 and a substantially vertical pivot 160 connected with the flapping link 134. The outboard end of the piston rod 154 is threaded and carries a lock nut 164 mounting a plate 166 forming an outer abutment for a compression spring 168. A housing 170 has a shoulder 172 fixed to it at its inner end and a shoulder 174 fixed to it at its outer end for restraining and preloading the spring 168. As the cylinder housing 150 is moved toward the left with respect to the piston rod 154, the shoulder 172 is contacted by the left-hand end of housing 150 and the spring 168 is further compressed against the plate 166. As the housing 150 moves toward the right, the left hand end of the cylinder 150 will leave the shoulder 172 and the damper will operate without the action of the spring 168. Thus, as power is supplied to the rotor, the action of the damper is modified by the spring 168 biasing the blade toward the power-off range and adding resistance to drag movements of the blade around the pivot 147. As the blade moves into the autorotative position, this spring bias is removed and the damper alone resists vibrations in the spar 132.

When the rotor is stopped, the blade can be moved by the spring to an intermediate position so that when power is applied the blade will not be strained by a suddenly applied load.

Figure 10:
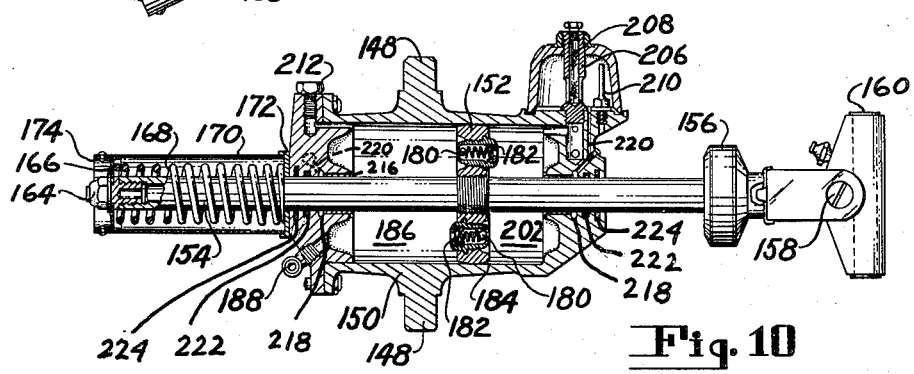
Figs. 10 and 11 are detail sectional views thereof.
Figure 11:
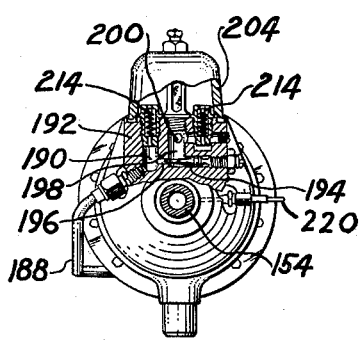

In Figs. 10 and 11, the details of construction of the damper of this modification are shown. The piston 152 is provided with a pair of ball valve type oppositely arranged check valves 180. The upper check valve will pass fluid from the left hand chamber to the right hand chamber and the lower check valve 180 will pass fluid from the right hand chamber to the left hand chamber and each will resist fluid movement in the opposite sense. Thus, by adjusting or presetting each check valve by means of screw plugs 182, the characteristics of motion of the piston 152 within the cylinder 150 can be controlled and relief of excess pressure is permitted. The piston 152 has a small clearance at 184 between the walls of the cylinder 150 which acts as an orifice so that small amounts of fluid can pass around the piston for slow rates of change of position of the piston 152 within the cylinder 150. For very fast rates, the valves 180 will operate. The left hand chamber 186 communicates with a pipe 188 that is connected to a chamber 190 formed in a boss 192 at the inboard end of the cylinder housing 150. Fluid passing through the pipe 188 (or a suitable built-in passage) can pass an adjustable orifice 196 restricted by a needle valve 194 through a passage 198 into a passage 200 and into the right hand chamber 202. Fluid from the chamber 202 flows just oppositely to the flow above described into the chamber 186. A filler reservoir 204 which may be of transparent plastic or of metal is secured to the housing by a filler stem 206, the upper part of which is hollow and provided with a screen 208. A tube forms an air vent 210 communicating with the atmosphere. An air vent 212 is provided at the left hand upper end of the cylinder 150 and can be unscrewed so that air within the chambers 186 and 202 can be bled out of the fluid system. Ball type spring biased check valves 214 are provided in the boss 192 so that oil may enter the chambers 186 and 202.

The end seals for the piston rod 154 are of improved low pressure form. A bearing 216 fits the rod 154 closely to permit virtually no leakage. A groove 218 surrounds the rod beyond this sleeve and communicates with passages 220 to the reservoir 204 which contains oil at atmospheric pressure. A seal 222 and felt washer 224 prevent any low pressure leakage beyond the groove 218.

In all modifications each chamber is connected to the vented reservoir through passages having check valves therein which are biased to remain closed when the pressure within the associated chamber is greater than atmospheric but which open readily upon the pressure dropping below atmospheric. With this arrangement a pressure other than atmospheric can exist only on one side of the piston when movement is in a given sense, thus preventing suction which could cause air to be drawn into the system. If any air should enter the system it is vented to the atmosphere through the reservoir. Thus the dampers are all "hard" dampers in that they are, at all times, completely filled with oil and are therefore effective for even slight movements.

While I have shown and described three forms which my invention may take, it is obvious that the parts thereof could be arranged somewhat differently to still obtain the objects of the invention. For example, the piping communicating between the chambers could be formed as cast passages in the housing. For these reasons, I do not wish to be limited to those forms shown and described but by the scope of the following claims.

I claim:

1. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain fluid, fluid flow control means for providing two different damper rates, each of which is used to control blade movements under a different flight condition including, fluid passage means between said chambers having fixed orifice means therein controlling the rate of fluid flow between said chambers during hovering flight when blade movement about its drag hinge is at a minimum and fluid pressure in the damper is relatively low, said fluid passage means between said chambers also having pressure relief valve means therein responsive to a predetermined fluid pressure in either chamber to open and relieve said pressure under forward flight conditions when high damper pressures are induced due to greater chordwise travel of said blade.

2. An improved fluid damper for use in rotary wing aircraft of the type wherein a rotor blade is mounted on a hub for movement about flapping and drag hinges, said damper comprising cylinder and piston elements, one of which is movable with the blades as the latter moves about its drag hinge and the other of which is fixed relative to said blade, said piston and cylinder elements forming two variable volume chambers adapted to contain fluid, fluid flow control means for providing two different damper rates, each of which is used to control chordwise blade movements under a different flight condition including, fluid passage means between said chambers having fixed orifice means therein controlling the rate of fluid flow between said chambers during hovering flight in proximity to the ground when blade movement about its drag hinge is at a minimum and maximum opposition to such blade movement is required to avoid ground resonance, said fluid passage means between said chambers also having pressure relief valve means therein responsive to a predetermined fluid pressure in either chamber which is higher than the pressure encountered in hovering flight to open and relieve the high pressure encountered under forward flight conditions when blade movement about its drag hinge is high and minimum opposition to such blade movement is required to relieve blade stresses.

3. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain fluid, means providing a high degree of opposition to the relatively small travel of said movable element during landing and take off to avoid ground resonance including passage means communicating with said chambers and having therein fixed orifice means of small cross section, and means providing a lesser degree of opposition to the large travel of said movable element encountered under forward flight conditions including pressure relief valve means in said passage means, and valve controlling means for holding said relief valve means closed until a predetermined pressure has been built up in a connected chamber which is just slightly above the maximum pressure built up in said damper under conditions favorable to ground resonance, whereby the stress level in said blade due to chordwise blade movement is limited to a predetermined maximum value during both forward flight and hovering flight near the ground.

4. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain fluid, means providing a predetermined amount of damping of the relatively small chordwise movements of said blade during hovering flight near the ground to avoid ground resonance by slowly relieving the relatively low pressure then built up in the damper including passage means communicating with said chambers and having restricted orifice means therein, and means for relieving chordwise blade stress due to the relatively high pressure built up in the damper under forward flight conditions when large movements of said blade take place about its drag hinge including pressure relief valve means in said passage means, and valve controlling means for holding said relief valve means closed until a predetermined pressure has been built up in a connected chamber which is just slightly above the maximum damper pressure prevailing under conditions favorable to ground resonance, whereby the chordwise stress level in said blade is held down to a predetermined maximum value which is below the fatigue level of the blade under all conditions of flight.

5. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain oil, said damper including passage means between said chambers having fixed orifice means therein offering sufficient restriction to fluid flow to give the required damping to absorb the small blade displacements about said drag hinge which occur in hovering flight near the ground and prevent ground resonance, said passage means communicating with said chambers also having pressure relief valve means therein, and means for holding said valve closed until, as a result of the increased blade displacements encountered in forward flight, a higher damper pressure than that encountered in said hovering flight is built up in said damper.

6. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain oil, said damper having means providing sufficient damping for limiting the small movements of the blade about said drag hinge to avoid ground resonance in hovering flight near the ground including a passage connecting said chambers having fixed orifice means therein of restricted cross section, additional passage means having pressure relief valve means therein, and means for holding said valve means closed until a predetermined fluid pressure has been built up in said damper which is above the pressure encountered in said damper under conditions favorable to ground resonance, whereby the high pressures normally set up in said chambers due to the high chordwise vibratory stresses in said blade in forward flight will be relieved by said valve means.

7. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said blade, said piston and cylinder elements forming two variable volume chambers adapted to contain oil, said damper having means providing sufficient damping for limiting the small movements of the blade about said drag hinge and avoiding ground resonance in landing including a passage connecting said chambers having fixed orifice means therein of small cross section, additional passage means communicating with said chambers having pressure relief valve means therein, and means for holding said valve means closed until a predetermined pressure has been built up in said damper due to the large chordwise blade movements encountered in forward flight which is above the pressure encountered in said damper under conditions favorable to ground resonance when said chordwise movements are relatively small, whereby the chordwise vibratory stress level in said blade never exceeds a stress level corresponding to said predetermined pressure value which is below the vibratory fatigue level for said blade.

8. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said moving blade, said piston and cylinder elements forming two variable volume chambers adapted to contain liquid, means for supplying liquid to said chambers including a liquid reservoir and passage means connecting each chamber with said reservoir, fixed orifice means in said passage means providing maximum resistance to liquid flow from said chambers during hovering flight near the ground when movements of said blade about its drag hinge are small and liquid pressure in said chamber is relatively small, said passage means also having pressure relief valves therein, adjustable valve controlling means for normally holding said relief valves closed, said controlling means being adjusted so as to hold said valves closed under relatively low liquid pressure in said damper during said hovering flight and to permit said valves to open under the higher pressures prevailing in normal forward flight when large chordwise blade movements occur.

9. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said moving blade, said piston and cylinder elements forming two variable volume chambers adapted to contain liquid, means for supplying liquid to said chambers including a liquid reservoir and passage means connecting each chamber with said reservoir, fixed orifice means in said passage means providing maximum resistance to liquid flow from said chambers during hovering flight near the ground when movements of said blade about its drag hinge are small and liquid pressure in said chamber is relatively small, said passage means also having pressure relief valves therein, adjustable valve controlling means for normally holding said relief valves closed, said controlling means being adjusted so as to hold said valves closed under said relatively low liquid pressure in said damper during said hovering flight and to permit said valves to open under the higher pressures prevailing in normal forward flight when large chordwise blade movements occur, and means for removing air trapped in the fluid within said body.

10. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said moving blade, said piston and cylinder elements forming two variable volume chambers adapted to contain liquid, means for supplying liquid to said chambers including a liquid reservoir and passage means connecting each chamber with said reservoir, fixed orifice means in said passage means providing maximum resistance to liquid flow from said chambers during hovering flight near the ground when movements of said blade about its drag hinge are small and liquid pressure in said chamber is relatively small, said passage means also having pressure relief valves therein, adjustable valve controlling means for normally holding said relief valves closed, said controlling means being adjusted so as to hold said valves closed under said relatively low liquid pressure in said damper during said hovering flight and to permit said valves to open under the higher pressures prevailing in normal forward flight when large chordwise blade movements occur, and adjustable resilient stop means for limiting the range of movement of said movable damper element.

11. An improved fluid damper for use in rotary wing aircraft of the type wherein a rotor blade is mounted on a hub for movement about flapping and drag hinges, said damper comprising cylinder and piston elements, one of which is movable with the blade as the latter moves about its drag hinge and the other of which is fixed relative to said moving blade, said piston and cylinder elements forming two variable volume chambers adapted to contain liquid, means for supplying liquid to said chambers including a reservoir adapted to contain liquid and having fluid communication with both chambers, means for providing maximum resistance to liquid flow from said chambers during hovering flight near the ground when movements of said blade about its drag hinge are small and liquid pressures in said damper are small including a passage provided by predetermined fixed clearance between said piston and cylinder walls oppositely opening relief valves in said piston, adjustable spring biasing means for holding said valves closed, said biasing means being adjusted so as to hold said valves closed under the relatively low liquid pressure in said damper during said hovering flight and to permit said valves to open under the higher damper pressures prevailing in normal forward flight when large chordwise blade movements occur.

12. A damping device for an aircraft rotor, said damping device including a cylinder, a double acting piston mounted in said cylinder, a hydraulic reservoir, a channel leading from each end of said cylinder to said reservoir, a pressure relief valve body associated with each channel, and a single spring device adapted to load both of said valve bodies.

13. A hydraulic damping unit for an aircraft rotor including a body member having a cylindrical bore chamber, a piston mounted in said chamber for double acting damping motions therein, two fluid channels each having its axis parallel to the axis of said chamber, a fluid reservoir associated with said body member at approximately the longitudinal center thereof, a fluid connection between said reservoir and the middle of each parallel channel, a fluid connection from each channel to each end of said chamber, and valve means in each channel between the reservoir connection and the chamber connection, the valve means in one channel being adapted to allow substantially unrestricted flow from said reservoir to said chamber, and the valve means in the other channel being adapted to provide flow from said chamber to said reservoir upon development of a predetermined pressure in said chamber.

MICHEL D. BUIVID.

REFERENCES CITED

The following references are of record in the file of this patent:

UNITED STATES PATENTS

| Number | Name | Date |
| --- | --- | --- |
| 700,162 | Wiley | May 13, 1902 |
| 1,067,444 | Scott | July 15, 1913 |
| 1,614,657 | Cotton | Jan. 18, 1927 |
| 1,948,457 | Larsen | Feb. 20, 1934 |
| 2,046,889 | Wyeth | July 7, 1936 |
| 2,216,163 | Ray | Oct. 1, 1940 |
| 2,250,826 | Everts | July 29, 1941 |